United States Patent [19]

Taylor

[11] Patent Number: 4,904,221
[45] Date of Patent: Feb. 27, 1990

[54] MISSISSIPPI TURKEY CALLER

[76] Inventor: Archie Taylor, Rte. 1, Box 12-C, Lake, Miss. 39092

[21] Appl. No.: 228,685

[22] Filed: Aug. 5, 1988

[51] Int. Cl.$^4$ .............................................. A63H 5/00
[52] U.S. Cl. .................................................. 446/397
[58] Field of Search ........................ 446/397, 418, 417

[56] References Cited

U.S. PATENT DOCUMENTS

| | | | |
|---|---|---|---|
| 1,034,307 | 7/1912 | Saunders | 446/397 X |
| 2,025,181 | 12/1935 | Simon | 446/397 |
| 2,643,483 | 6/1953 | Walker | 446/397 |
| 2,958,157 | 11/1960 | Tannehill | 446/397 |
| 4,041,639 | 8/1977 | Funk | 446/397 |
| 4,387,531 | 6/1983 | Jacob | 446/397 |
| 4,586,912 | 5/1986 | Adams | 446/397 |
| 4,606,733 | 8/1986 | Willis | 446/397 |
| 4,648,852 | 3/1987 | Wingate | 446/397 |

Primary Examiner—Mickey Yu
Attorney, Agent, or Firm—Robert A. Miller; Penrose Lucas Albright

[57] ABSTRACT

A device for calling wild turkeys that is equally effective wet or dry, is durable, is easily carried, and is simple to use. The device comprises a plate, preferably plate glass, held cupped in one hand and a striker held in the other hand. When the end of the striker is moved across the surface of the plate a tone is produced. By adjusting the manner in which the plate is held, the tone may be changed and by moving the striker in various ways the tone takes on characteristics which replicate wild turkey calls.

3 Claims, 5 Drawing Sheets

MISSISSIPPI TURKEY CALLER

BACKGROUND OF THE INVENTION

1. Field of Invention

This invention relates to an apparatus for calling wild turkeys that is as effective in wet and adverse weather conditions as it is in dry weather.

2. Related Art

Devices are known that may be used to call wild turkeys; however, they have the inherent disadvantage in that they are less effective, and in many cases ineffective, during adverse weather conditions or after getting wet.

U.S. Pat. No. 1,034,307, of Saunders, discloses a bird call consisting of a striker and a plate. The striker is a uniquely carved piece of wood that is mounted in a hollowed out corncob. The corncob is open at the top to permit the user to alter the tone emitted by altering the size of the opening with his/her thumb. The striker, which has a rounded head and blade with flattened sides, is brought into frictional contact with the plate. The plate is made of slate and held in the cupped palm of the hand. In practice, however, wood and hollowed out corncobs suffer from a lack of durability, and slate plates are subject to chipping and scaling, which can result in sharp edges that limit how the plate can be held or produce a rough surface that is unusable. Further, when slate gets wet, from rain, perspiration, or immersion in a body of water, it "bleeds" to produce a substance that resembles a soap film. When this occurs, the necessary friction to produce the desired tones cannot be attained.

The device of Tannehill, U.S. Pat. No. 2,958,157, consists of a sound rod made of wood mounted in a vibrator. The sound rod is rubbed across the surface of a slate mounted in a sound box. The vibrator may be attached to the sound box during transport. Although mounting the slate in the sound box provides greater protection for the slate, particularly against chipping or flaking, than the slate of Saunders, the sound rod remains subject to breakage and the device is of marginal, if any, use in wet weather because of the "bleeding" effect of slate.

A device that overcomes some of the disadvantages of Saunders and Tannehill is that of Walker, U.S. Pat. No. 2,643,483. Walker's device consists of a canister having a rotatable upper portion, mounting a slate, and a bottom portion having a second elevated floor with wood pegs mounted thereon. When the top is rotated, the friction between the slate disc and the wood pegs produces a tone that varies based upon the method of rotation. This device provides increased protection to the slate and pegs as well as reducing the likelihood the slate will get wet. However, it does so at the expense of increased complexity in the number of pegs and their fit to ensure proper operation of the device.

SUMMARY OF THE INVENTION

In accordance with the present invention there is provided a wild turkey caller that may be used effectively in all weather conditions, remains true in tone and enables the user to repeatedly make the same call, is portable and is highly resistant to damage.

The device comprises a sound plate, preferably composed of plate glass, that is held cupped in one hand, and a stylus shaped striker held in the other hand. The striker is rubbed across the plate in various ways to replicate the sounds produced by wild turkeys.

DESCRIPTION OF THE PREFERRED EMBODIMENT

Figure 1:
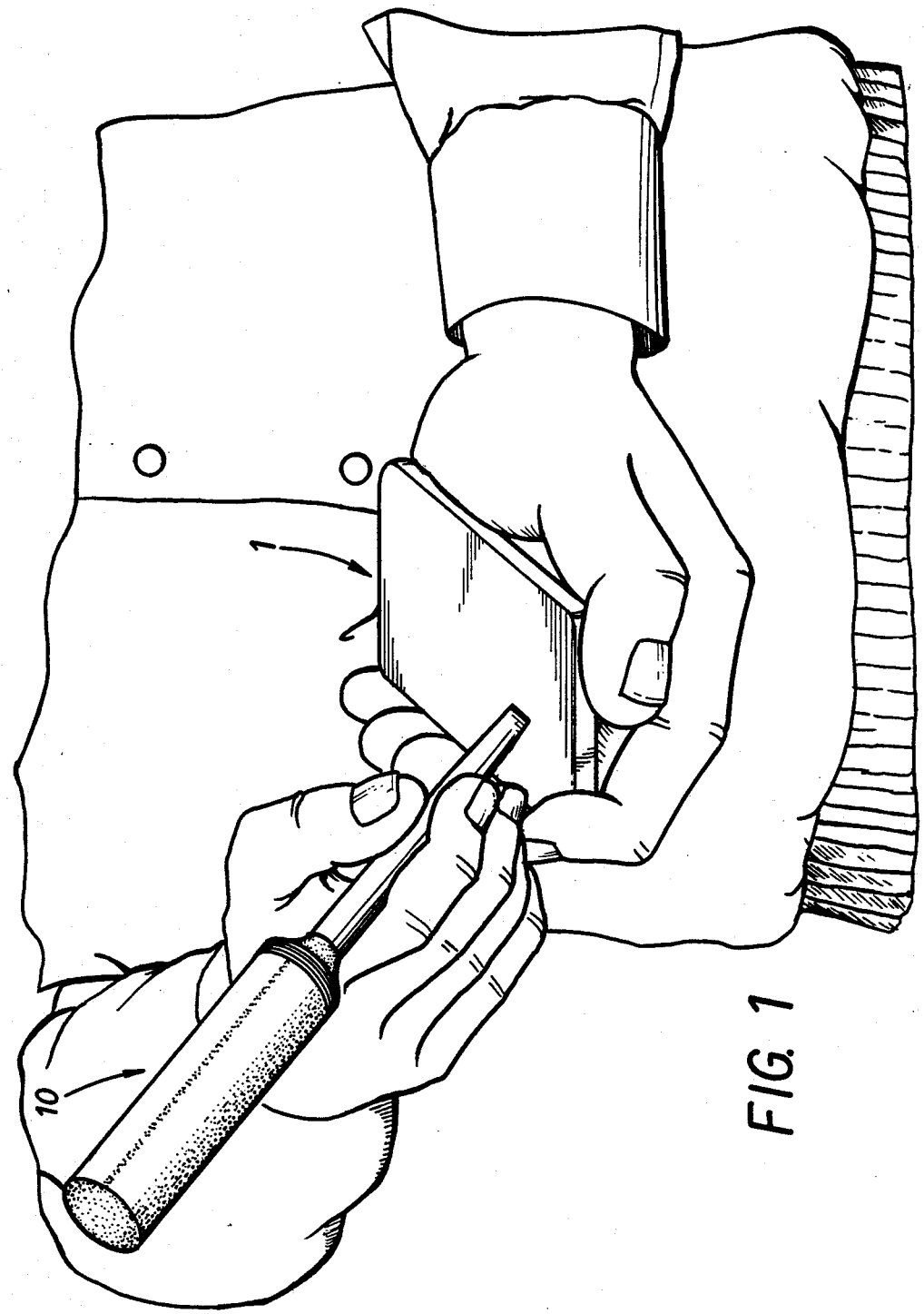
FIG. 1 illustrates the use of the invention, termed a Mississippi Turkey Caller.
Figure 2:
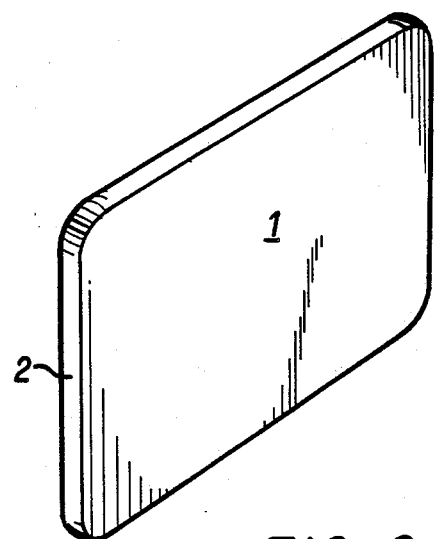
FIG. 2 is an oblique view of the plate.

The plate 1 is made of hardened plastic or glass, but preferably is composed of plate glass such as is commonly used for store front windows. It has a rectangular shape measuring approximately three inches long by 2⅜ inches wide. Plate 1 is about one-fourth inch thick. The size is predicated on the hand size of the "average" hunter so that the plate may be held in the cupped hand of the user, as shown in FIG. 1, with a gap between the user's palm and the center of plate 1. The edges 2 have been rounded, as have corners 2a, so that plate 1 may be held securely, without injury or discomfort, by the user. If desired plate 1 may be custom made for specific users.

The striker 10 consists of a shaft 6 and a handle. The shaft 6 is essentially unchanged in all striker embodiments 10a, b, c and d described herebelow except for the upper shaft portion that is attached to or is part of the handle.

Figure 3:
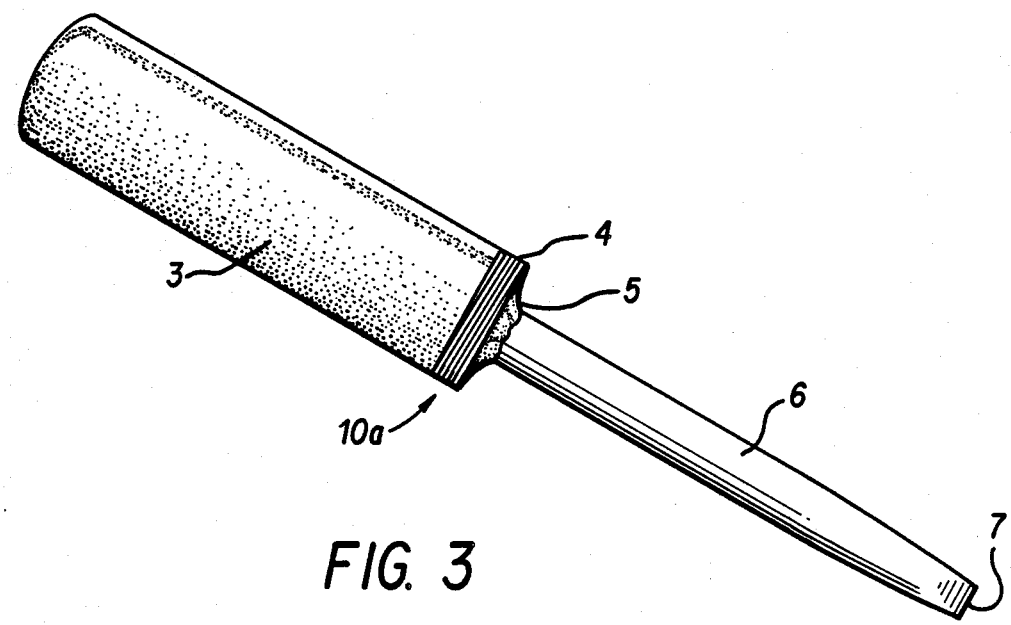
FIG. 3 is a side view of the striker.

The striker 10a, as seen in FIG. 3, has a shaft 6 that terminates in a squared end 7. Shaft 6 has an oval, or round, cross section with the cross section decreasing over the lower third of the shaft 6 as it approaches squared end 7 and, although the preferred material for shaft 6 is plexiglass, or a similar plastic material, some metals, such as aluminum, that will not scratch plate 1 may be used. It is approximately 6 inches long. The upper two inches of shaft 6 are embedded in a handle 3 made from a corncob. The shaft 6 is retained in the corncob by an adhesive material and the point of entry is protected by a resin bead 5 encircling the shaft 6. The lower end of the corncob handle 3 is reinforced, to prevent the corncob from cracking or splitting, by wrapping it with a strong thread 4 or similar material.

Figure 4:
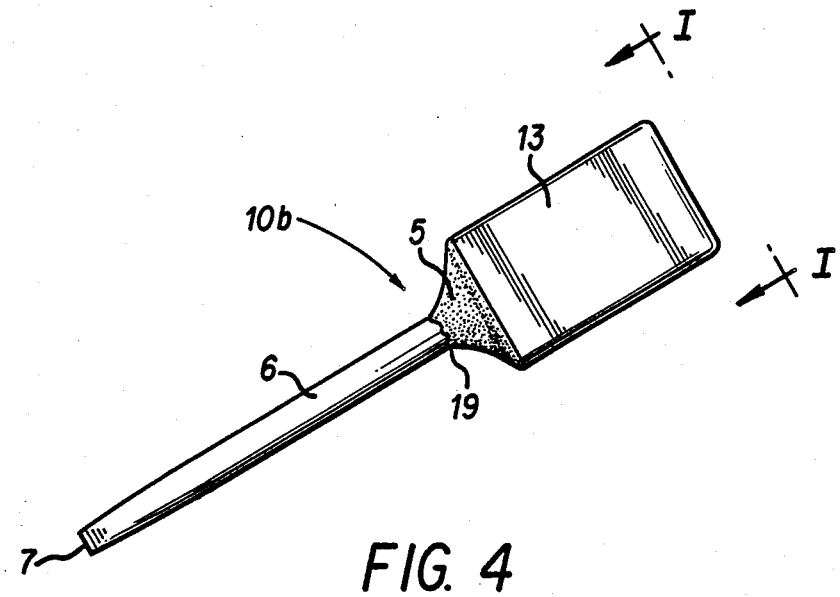
FIG. 4 is a side view of a striker having a second handle configuration.
Figure 5:
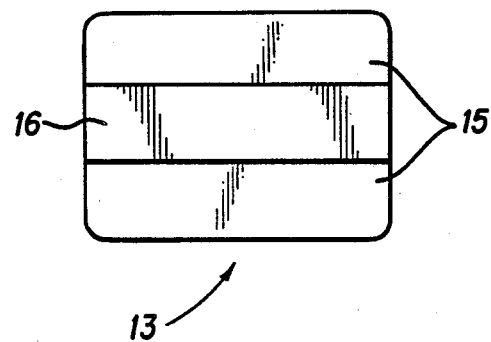
FIG. 5 is an end view of the handle of the striker shown in FIG. 4.

An alternative configuration for the striker is shown in FIGS. 4 and 5. For striker 10b, the corncob handle 3 has been replaced by plexiglass handle 13. The exposed portion of shaft 6 and the truncated end 7 remain unchanged. However, the portion of shaft 6 that would be embedded in the corncob handle has been adapted to form the center section 16 of handle 13. At point 19, the edges of shaft 6 flair outwardly to form center section 16. Handle 13 is approximately two inches long and one inch wide. It has a depth of three-fourths of an inch produced by two side sections 15 each having a thickness of one-fourth of an inch and the center section 16, also having a thickness of one-fourth of an inch. The side sections 15 are rigidly attached to center section 16 by adhesive or other means known in the art. The edges of handle 13 are rounded for user comfort. At the base of handle 13, on both sides of shaft 6 adjacent point 19 is a bead of resin 5, or similar material, to produce a smooth transition from shaft 6 to handle 13.

Figure 6:
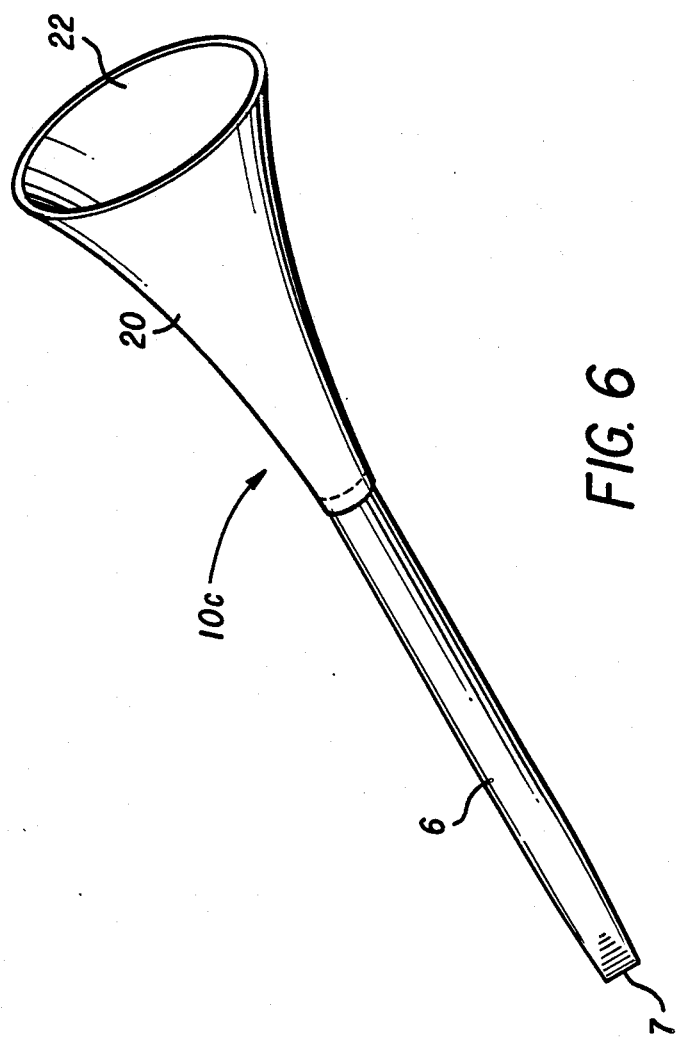
FIG. 6 is a side view of a striker having a third handle configuration.

A third configuration of the striker is shown in FIG. 6. The upper portion of striker 10c has a handle 20 that may be of cone or horn shape. As shown in FIG. 6 the handle has a slightly flared horn-like configuration. Handle 20 has a hollow interior that amplifies the sound produced by moving striker 10c over the surface of plate 1. Shaft 6 and handle 20 may be constructed of one solid piece of material or may be produced separately and joined by means known in the art, such as an adhesive appropriate to the materials used for shaft 6 and handle 20. The exposed or lower portion of shaft 6 is about three and one-half inches long and handle 20 about two and one-half inches in length. The outside diameter of the open upper end 22 of handle 20 is about two and one-quarter inches.

Figure 7:
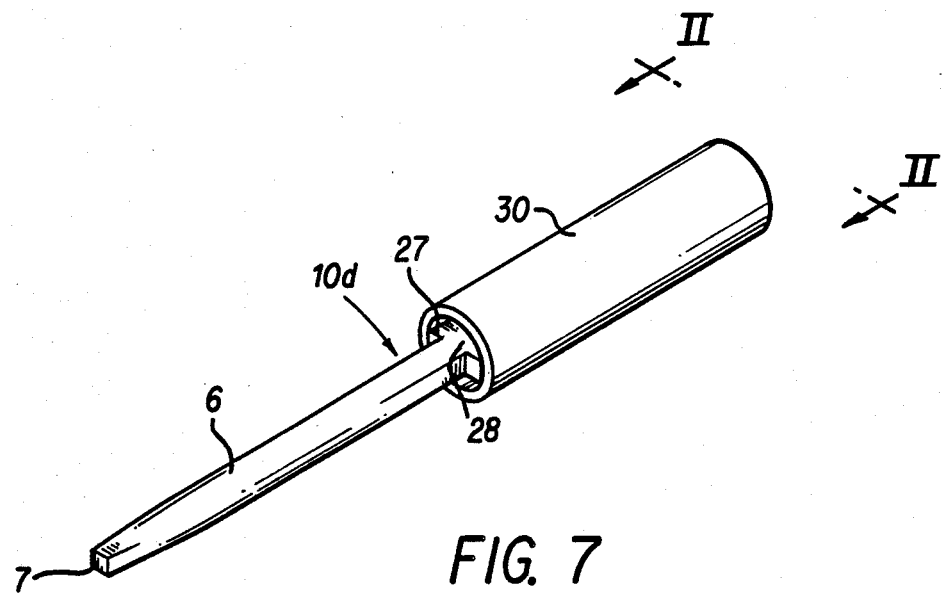
FIG. 7 is a side view of a striker having a fourth handle configuration.
Figure 8:
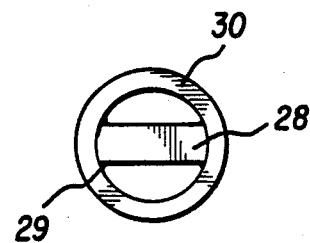
FIG. 8 is an end view of the handle of the striker shown in FIG. 7.

A fourth configuration of striker 10 is shown in FIGS. 7 and 8. The handle 30 for striker 10d consists of a piece of plastic pipe, having a diameter of approximately one-half inch, as commonly used for transporting water such as PVC pipe. Handle 30 is approximately three inches long and is attached by an adhesive 29 to a continuation portion 28 of shaft 6. In this embodiment, the lower exposed portion of shaft 6 is three to four inches long and at point 27 the edges of shaft 6 flair outwardly to form continuation portion 28. Continuation portion 28 is sized to fit inside the pipe handle 30 and be retained therein by known means. The pipe handle 30 remains open at both ends thereby producing an amplified, or louder, call than that produced by strikers 10a and 10b.

The method of using all strikers 10a, b, c, and d is, for all intents, the same as described herein.

Prior to first time use, the flat surfaces of plate 1 are sanded transverse to the long axis, or side-to-side. One side is sanded using a very coarse sandpaper, and the opposite side using a fine sandpaper. This produces the needed frictional surface. Subsequently, as needed, plate 1 is again sanded from time to time.

The device is used as shown in FIG. 1. Plate 1 is held in the cupped palm of the hand by pressure being applied by the base of the thumb on one side and approximately the first joint of the fingers on the other. The end of the thumb is along the short edge of plate 1 away from the user's body. By varying the pressure with which the plate is held, the size and shape of the resonance chamber between the palm and plate bottom is altered thereby altering the tone. The edge of the hand closest to the body should be in contact with the body. Again the pressure of contact alters the size and shape of the resonance chamber thereby altering the emitted tone.

Striker 10 is held in the opposite hand much as one would hold a pencil. Prior to first use, the flat end 7 must be sanded with subsequent sandings as necessary. Striker 10 is held at a right, 90 degree, angle to the surface of plate 1 so that the total surface of flat end 7 is in contact with the surface of plate 1. The sounds of a wild turkey are replicated by movement of the striker 10 across the surface of plate 1. For example, moving the striker 10 in a manner as if to strike a match produces a "cluck" sound, a continuous series of "Os" produces a "yelp". Other movements produce corresponding wild turkey calls. Moving striker 10 across the surface of plate 1 that has been sanded with fine sand paper produces a higher pitched tone than does using the surface sanded with coarse sandpaper. Thus by alternating any or all of the following; the manner in which plate 1 is held, the surface of plate 1 used, and the pattern of striker 10 movement across the surface of plate 1, the user may replicate the full range of sounds produced by wild turkeys.

Although the preferred embodiment of the present invention has been disclosed and described in detail above, it should be understood that the invention is not necessarily limited thereby and its scope is to be determined by that of the following claims.

Having described my invention, what I claim as new and to be secured by Letters Patent of the United States is:

1. A wild turkey caller, comprising:
   a plate, said plate being substantially rectangular and capable of being held comfortably, but firmly in a cupped hand;
   a striker, said striker composed of a hard plastic material and having an essentially oval shaft, said shaft terminating in a flat end wherein a tone is produced when said flat end of said striker is moved across the surface of said plate that replicates the calls of wild turkeys and an end opposite said flat end, said opposite end flaring outwardly and upwardly to form a center section of a handle; and two pieces of plastic material rigidly attached one to each side of said center section of said handle.

2. A Mississippi turkey caller, comprising:
   a rectangular plate, said plate having substantially flat upper and lower surfaces and rounded edges and corners and being of such size that it can be firmly held in the cupped hand of a user; and
   a striker, said striker further comprising an upper handle and a lower shaft, said shaft being essentially oval in cross-section, said cross-section decreasing in size from near said upper handle to where said shaft terminates in a flat tip wherein said shaft of said striker is composed of a hard plastic and said upper handle further comprises hard plastic pieces rigidly attached to a hilt of said striker.

3. A wild turkey caller, comprising:
   a rectangular tempered glass plate, said plate having substantially flat upper and lower surfaces and rounded edges and corners and being of such size and shape that it fits in the cupped hand of its user; and
   a hard plastic striker, said striker further comprising an upper handle and a lower shaft, said lower shaft being essentially oval in cross-section, said cross-section decreasing in size, from near said upper handle to where said lower shaft terminates in a flat tip wherein said upper handle further comprises hard plastic pieces firmly secured to a hilt of said hard plastic striker.

* * * * *